(12) United States Patent
Gharib et al.

(10) Patent No.: US 8,514,268 B2
(45) Date of Patent: Aug. 20, 2013

(54) METHOD AND DEVICE FOR HIGH-RESOLUTION THREE-DIMENSIONAL IMAGING WHICH OBTAINS CAMERA POSE USING DEFOCUSING

(75) Inventors: Morteza Gharib, San Marino, CA (US); Jian Lu, Laguna Hills, CA (US); Scott Hsieh, Anaheim, CA (US); Francisco Pereira, Rome (IT); Alexei Harvard, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 783 days.

(21) Appl. No.: 12/454,707

(22) Filed: May 21, 2009

(65) Prior Publication Data
US 2009/0295908 A1    Dec. 3, 2009

Related U.S. Application Data

(63) Continuation-in-part of application No. 12/011,023, filed on Jan. 22, 2008, now Pat. No. 7,826,067, and a continuation-in-part of application No. 12/011,016, filed on Jan. 22, 2008, and a continuation-in-part of application No. 12/150,237, filed on Apr. 23, 2008, now Pat. No. 7,916,309, and a continuation-in-part of application No. 12/150,238, filed on Apr. 23, 2008, now Pat. No. 7,894,078, and a continuation-in-part of application No. 12/150,239, filed on Apr. 23, 2008, now abandoned, and a continuation-in-part of application No. 12/150,236, filed on Apr. 23, 2008.

(60) Provisional application No. 61/190,255, filed on Aug. 27, 2008, provisional application No. 61/208,534, filed on Feb. 25, 2009.

(51) Int. Cl.
| H04N 13/02 | (2006.01) |
| A61B 1/04 | (2006.01) |
| H04N 7/00 | (2011.01) |
| H04N 7/18 | (2006.01) |

(52) U.S. Cl.
USPC .......... 348/46; 348/38; 348/45; 348/50; 348/66; 348/94

(58) Field of Classification Search
USPC .......................................... 348/46
See application file for complete search history.

(56) References Cited

U.S. PATENT DOCUMENTS

| 4,264,921 A | 4/1981 | Pennington et al. |
| 4,727,471 A * | 2/1988 | Driels et al. ............ 700/66 |

(Continued)

FOREIGN PATENT DOCUMENTS

| EP | 1 175 106 | 1/2002 |
| GB | 2242270 A | 3/1991 |

(Continued)

OTHER PUBLICATIONS

Favaro, Paolo et al. "Observing Shape from Defocused Images," International Journal of Computer Vision, vol. 52, Issue 1, 2003, pp. 25-43.*

(Continued)

*Primary Examiner* — Melvin H Pollack
(74) *Attorney, Agent, or Firm* — Mark Stirrat; One LLP

(57) ABSTRACT

A method and device for high-resolution three-dimensional (3-D) imaging which obtains camera pose using defocusing is disclosed. The device comprises a lens obstructed by a mask having two sets of apertures. The first set of apertures produces a plurality of defocused images of the object, which are used to obtain camera pose. The second set of optical filters produces a plurality of defocused images of a projected pattern of markers on the object. The images produced by the second set of apertures are differentiable from the images used to determine pose, and are used to construct a detailed 3-D image of the object. Using the known change in camera pose between captured images, the 3-D images produced can be overlaid to produce a high-resolution 3-D image of the object.

16 Claims, 6 Drawing Sheets

(56) References Cited

U.S. PATENT DOCUMENTS

| | | | |
|---|---|---|---|
| 4,879,664 A | | 11/1989 | Suyama et al. |
| 4,948,258 A | | 8/1990 | Caimi |
| 5,018,854 A | * | 5/1991 | Rioux ............................ 356/609 |
| 5,031,154 A | | 7/1991 | Watanabe |
| 5,075,561 A | | 12/1991 | Rioux |
| 5,168,327 A | * | 12/1992 | Yamawaki ..................... 356/609 |
| 5,206,498 A | | 4/1993 | Sensui |
| 5,216,695 A | | 6/1993 | Ross et al. |
| 5,235,857 A | | 8/1993 | Anderson |
| 5,270,795 A | | 12/1993 | Blais |
| 5,351,078 A | * | 9/1994 | Lemelson ..................... 348/135 |
| 5,373,151 A | | 12/1994 | Eckel, Jr. et al. |
| 5,579,444 A | | 11/1996 | Dalziel et al. |
| 5,604,344 A | | 2/1997 | Finarov |
| 5,714,762 A | | 2/1998 | Li et al. |
| 5,745,067 A | | 4/1998 | Chou et al. |
| 5,864,359 A | | 1/1999 | Kazakevich |
| 5,922,961 A | | 7/1999 | Hsu et al. |
| 6,157,747 A | * | 12/2000 | Szeliski et al. ................ 382/284 |
| 6,229,913 B1 | * | 5/2001 | Nayar et al. .................. 382/154 |
| 6,229,959 B1 | * | 5/2001 | Suda et al. ....................... 396/50 |
| 6,271,918 B2 | | 8/2001 | Blais |
| 6,278,847 B1 | | 8/2001 | Gharib et al. |
| 6,748,112 B1 | * | 6/2004 | Nguyen et al. ................ 382/203 |
| 6,750,904 B1 | * | 6/2004 | Lambert ..................... 348/218.1 |
| 6,765,569 B2 | * | 7/2004 | Neumann et al. .............. 345/419 |
| 6,912,293 B1 | * | 6/2005 | Korobkin ....................... 382/100 |
| 6,915,008 B2 | * | 7/2005 | Barman et al. ................. 382/154 |
| 6,943,349 B2 | * | 9/2005 | Adamec et al. .................... 850/9 |
| 6,955,656 B2 | | 10/2005 | Bergheim et al. |
| 6,965,690 B2 | | 11/2005 | Matsumoto |
| 7,006,132 B2 | * | 2/2006 | Pereira et al. ............... 348/218.1 |
| 7,171,054 B2 | | 1/2007 | Fiete et al. |
| 7,236,622 B2 | | 6/2007 | Chen et al. |
| 7,260,274 B2 | * | 8/2007 | Sawhney et al. .............. 382/284 |
| 7,271,377 B2 | | 9/2007 | Mueller et al. |
| 7,340,077 B2 | | 3/2008 | Gokturk et al. |
| 7,372,642 B2 | | 5/2008 | Rohaly et al. |
| 7,423,666 B2 | * | 9/2008 | Sakakibara et al. ........... 348/136 |
| 7,496,226 B2 | * | 2/2009 | Negahdaripour et al. .... 382/154 |
| 7,565,029 B2 | | 7/2009 | Zhou et al. |
| 7,612,869 B2 | | 11/2009 | Pereira et al. |
| 7,612,870 B2 | | 11/2009 | Graff et al. |
| 7,668,388 B2 | | 2/2010 | Bryll |
| 7,715,918 B2 | | 5/2010 | Melvin |
| 7,747,151 B2 | * | 6/2010 | Kochi et al. ..................... 396/55 |
| 7,819,591 B2 | * | 10/2010 | Rohaly et al. ................. 396/459 |
| 7,916,309 B2 | | 3/2011 | Gharib et al. |
| 8,179,424 B2 | * | 5/2012 | Moller ............................ 348/46 |
| 2003/0096210 A1 | | 5/2003 | Rubbert et al. |
| 2003/0125719 A1 | | 7/2003 | Furnish |
| 2003/0160970 A1 | | 8/2003 | Basu et al. |
| 2003/0210407 A1 | | 11/2003 | Xu |
| 2004/0136567 A1 | | 7/2004 | Billinghurst et al. |
| 2004/0155975 A1 | * | 8/2004 | Hart et al. ...................... 348/335 |
| 2005/0025116 A1 | | 2/2005 | Chen et al. |
| 2006/0092314 A1 | * | 5/2006 | Silverstein et al. ........... 348/349 |
| 2006/0098872 A1 | | 5/2006 | Seo et al. |
| 2006/0209193 A1 | * | 9/2006 | Pereira et al. ............... 348/218.1 |
| 2006/0285741 A1 | | 12/2006 | Subbarao |
| 2007/0008312 A1 | | 1/2007 | Zhou et al. |
| 2007/0056768 A1 | | 3/2007 | Hsieh et al. |
| 2007/0076090 A1 | | 4/2007 | Alexander |
| 2007/0078500 A1 | | 4/2007 | Ryan et al. |
| 2007/0103460 A1 | | 5/2007 | Zhang et al. |
| 2007/0146700 A1 | * | 6/2007 | Kowarz et al. ................ 356/310 |
| 2007/0188769 A1 | | 8/2007 | Rohaly et al. |
| 2007/0195162 A1 | | 8/2007 | Graff et al. |
| 2007/0236694 A1 | | 10/2007 | Gharib et al. |
| 2008/0031513 A1 | | 2/2008 | Hart |
| 2008/0091691 A1 | | 4/2008 | Tsuji |
| 2008/0180436 A1 | | 7/2008 | Kraver |
| 2008/0239316 A1 | | 10/2008 | Gharib et al. |
| 2008/0259354 A1 | | 10/2008 | Gharib et al. |
| 2008/0278804 A1 | | 11/2008 | Gharib et al. |
| 2009/0129667 A1 | | 5/2009 | Ho et al. |
| 2009/0238449 A1 | | 9/2009 | Zhang et al. |
| 2009/0295908 A1 | | 12/2009 | Gharib et al. |
| 2010/0007718 A1 | * | 1/2010 | Rohaly et al. ................... 348/46 |
| 2011/0074932 A1 | | 3/2011 | Gharib et al. |

FOREIGN PATENT DOCUMENTS

| | | |
|---|---|---|
| JP | 2655885 B2 | 9/1997 |
| JP | 2001-16610 A | 8/2002 |
| JP | 2001-61165 A | 9/2002 |
| JP | 2003-289293 A | 10/2003 |
| JP | 2004-191240 A | 7/2004 |
| WO | WO 88/00710 A1 | 1/1988 |
| WO | WO 96/41304 A1 | 12/1996 |
| WO | WO 00/69357 A1 | 11/2000 |
| WO | WO 01/86281 A1 | 11/2001 |
| WO | WO 02/096478 A2 | 12/2002 |
| WO | WO 2006/009786 A2 | 1/2006 |
| WO | WO 2007/041542 A2 | 4/2007 |
| WO | WO2007056768 | 5/2007 |
| WO | WO 2007/095307 A1 | 8/2007 |
| WO | WO 2007/130122 A2 | 11/2007 |
| WO | WO 2008/091691 | 7/2008 |

OTHER PUBLICATIONS

Subbarao, Murali and Liu, Yen-Fu. "Analysis of Defocused Image Data for 3D Shape Recovery Using a Regularization Technique," SPIE, 1997.*

Nguyen, Vincent A. et al. "Detection of the Depth Order of Defocused Images," Vision Research, vol. 45, 2005, pp. 1003-1011.*

Donald Marquardt (1963). "An Algorithm for Least-Squares Estimation of Nonlinear Parameters," SIAM Journal on Applied Mathematics 11, 431-441, doi:10.1137/0111030a.

D. Lowe (1999), "Object recognition from local scale-invariant features," Proceedings of the International Conference on Computer Vision 2: 1150-1157.

Kenneth Levenberg (1944). "A Method for the Solution of Certain Non-Linear Problems in Least Squares," The Quarterly of Applied Mathematics 2, 164-168.

Chang, N.L., Efficient Dense Correspondences using Temporally Encoded Light Patterns, IEEE, Oct. 12, 2003.

El-Hakim S.F. et al., A System for Indoor 3-D Mapping and Virtual Environments, Proceedings of the SPIE, 1997.

Guarnieri, A et al., 3D Modeling of Real Artistic Objects with Limited Computers Resources, Proc. of XVIII CIPA Symposium on Architectural & Archaeological Photogrammetry, Oct. 1999.

Horn, E. et al., Toward Optimal Structured Light Patterns, 3DIM, 1997.

Koninckx, T.P. et al., A Graph Cut based Adaptive Structured Light approach for real-time Range Acquisition, 3EDPVT, 2004.

Kordelas, G. et al., State-of-the-art Algorithms for Complete 3D Model Recoonstruction, "Engage" Summer School, 2010.

Li, S.Z., Markov Random Field Models in Computer Vision, Springer-Verlag, 1995.

Maradia, A. et al., Fully Automatic Registration of 3D Point Clouds, Proceedings of the 2006 IEEE Computer Society Conference on Computer Vision and Pattern Recognition, 2006.

Mouaddib, E et al., Recent Progress in Structured Light in order to Solve the Correspondence Problem in Stereo Vision, Proceedings of the 1997 IEEE, Apr. 1997.

Neugebauer, P.J., Geometrical Cloning of 3D Objects via Simultaneous Registration of Multiple Range Images, Shape Modeling & Application, Mar. 1997.

Pagés, J. et al., Implementation of a Robust Coded Structured Light Technique for Dynamic 3D Measurements, ICIP, 2003.

Pereira, F. et al., Two-frame 3D particle tracking, Measurement Science and Technology 17, 2006, pp. 1680-1692.

Raij, A. et al., PixelFlex2: A Comprehensive, Automatic, Casually-Aligned Multi-Projector Display, PROCAMS, 2003.

Raskar, R. et al., Multi-Projector Displays Using Camera-Based Registration, IEEE Visualization, 1999.

Rocchini, C. et al., A low cost 3D scanner based on structured light, Computer Graphics Forum (Eurographics 2001 Conf. Issue).

Rusinkiewicz, S. et al., Real-Tiime 3D Model Acquisition, ACM Transactions on Graphics, 2002.
Salvi, J. et al., Pattern codification strategies in structured light systems, Pattern Recognition, 2004.
Scharstein, D. et al., A Taxonomy and Evaluation of Dense Two-Frame Stereo Correspondence Algorithms, IJCV, 2002.
Scharstein, D. et al., High-Accuracy Stereo Depth Maps Using Structured Light, IEEE Computer Society Conf. on Computer Vision and Pattern Recognition, 2003, vol. 1, pp. 195-202.
Sinofsky, Measurement of Laser Beam Spreading in Biological Tissue Scattering, SPIE vol. 712, Lasers in Medicine (1986).
Smith, E.R. et al., Registration of combined range-intensity scans: Initialization through verification, Computer Vision and Image Understanding 110, 2008, pp. 226-244.
Tardif, J. Multi-projectors for arbitrary surfaces without explicit calibration and reconstruction, DIM, 2003.
Tardif, J. et al., A MRF formulation for coded structured light, Proceedings of the $5^{th}$ Int'l Conf. on 3-D Digital Imaging & Modeling, 2005.
Wang, Z. et al., Extraction of the Corner of Checkerboard image, Proceedings of the $7^{th}$ World Congress on Intelligent Control and Automation, Jun. 25-27, 2008.
Weisstein, E., Gray Code, http://mathworld.wolfram.com/GrayCode.html, Mar. 10, 2010.
Williams, J.A. et al., Multiple View 3D Registration: A Review and a New Technique, Systems Man. & Cybernetics 10, 1999.
Yang, R. et al., PixelFlex: A Reconfigurable Multi-Projector Display System, IEEE Visualization, 2001.
Zhang, S. et al., High-resolution, Real-time 3D Shape Acquisition, IEEE Workshop of real-tiime 3D sensors & their uses, 2004.
PCT/US2008/000882, US, International Preliminary Report on Patentability, Aug. 6, 2009.
2008244494, AU, Examiner's First Report, Aug. 18, 2010.
PCT/US2008/005311, International Preliminary Report on Patentability/Written Opinion, Oct. 27, 2009.
PCT/US2008/005314, US, International Search Report, Sep. 8, 2008.
PCT/US2008/000991, US, International Preliminary Report on Patentability, Jul. 31, 2008.
PCT/US2005/021326, US, International Search Report, Feb. 1, 2007.
PCT/US2009/004362, US, Search Report, May 27, 2010.
PCT/US2009/004362, US, Preliminary Report on Patentability/Written Opinion, May 27, 2010.
PCT/US2009/004362, US, International Preliminary Report on Patentability/Written Opinion, Jan. 25, 1020.
Lowe, David G, "Three-Dimensional Object Recognition from Single Two-Dimensional Images," Artificial Intelligence, 31, 3 (Mar. 1987), pp. 355-395.
Wu, M.; Roberts, J. W.; and Buckley, M., "Three-dimensional fluorescent particle tracking at micron-scale using a single camera," Experiments in Fluids, 2005, 38, 461-465.
Willert, C.E.; and Gharib, M., "Three-dimensional particle imaging with a single camera," Experiments in Fluids, 1992, 12, 353-358.
F. Dellaert, S. Seitz, C. Thorpe, and S. Thrun (2000), "Structure from motion without correspondence," IEEE Computer Society Conference on Computer Vision and Pattern Recognition.
US08/00991, PCT International Search Report and the Written Opinion of the International Searching Authority, CIT May 2008.
US08/00882, PCT International Search Report and the Written Opinion of the International Searching Authority, CIT Mar. 2009.
US08/05313, PCT International Search Report and the Written Opinion of the International Searching Authority, CIT Aug. 2008.
US08/05314, PCT International Search Report and the Written Opinion of the International Searching Authority, CIT Apr. 2008.
US08/05315, PCT International Search Report and the Written Opinion of the International Searching Authority, CIT Apr. 2008.
PCT Invitation to Pay or Protest Additional Fee, CIT Jan. 2009.

* cited by examiner

METHOD AND DEVICE FOR HIGH-RESOLUTION THREE-DIMENSIONAL IMAGING WHICH OBTAINS CAMERA POSE USING DEFOCUSING

PRIORITY CLAIM

The present application is a continuation-in-part application, claiming the benefit of priority of U.S. patent application Ser. No. 12/011,023, filed Jan. 22, 2008, entitled "METHOD AND APPARATUS FOR QUANTITATIVE 3-D IMAGING;" U.S. patent application Ser. No. 12/011,016, filed Jan. 22, 2008, entitled "METHOD AND APPARATUS FOR QUANTITATIVE 3-D IMAGING;" U.S. patent application Ser. No. 12/150,237, filed on Apr. 23, 2008, entitled "SINGLE-LENS, SINGLE-APERTURE, SINGLE-SENSOR 3-D IMAGING DEVICE;" U.S. patent application Ser. No. 12/150,238, filed on Apr. 23, 2008, entitled "SINGLE LENS 3-D IMAGING DEVICE USING A POLARIZATION-CODED APERTURE MASK COMBINED WITH A POLARIZATION-SENSITIVE SENSOR;" U.S. patent application Ser. No. 12/150,239, filed on Apr. 23, 2008, entitled "APERTURE SYSTEM WITH SPATIALLY-BIASED APERTURE SHAPES AND POSITIONS (SBPSP) FOR STATIC AND DYNAMIC 3-D DEFOCUSING-BASED IMAGING;" and U.S. patent application Ser. No. 12/150,236, filed on Apr. 23, 2008, entitled "SINGLE-LENS, SINGLE-SENSOR 3-D IMAGING DEVICE WITH A CENTRAL APERTURE FOR OBTAINING CAMERA POSITION." The present application is also a non-provisional application, claiming the benefit of priority of U.S. Provisional Patent Application No. 61/190,255, filed Aug. 27, 2008, entitled "A DEFOCUSING FEATURE MATCHING SYSTEM TO RESOLVE CAMERA POSE;" and U.S. Provisional Patent Application No. 61/208,534, filed on Feb. 25, 2009, entitled "METHOD AND DEVICE FOR HIGH-RESOLUTION THREE-DIMENSIONAL IMAGING WHICH OBTAINS CAMERA POSE USING DEFOCUSING."

BACKGROUND OF THE INVENTION (1) Field of Invention

The present invention relates to three-dimensional imaging and, more particularly, to a method and device for high-resolution three-dimensional imaging which obtains camera pose using defocusing.

(2) Description of Related Art

The accurate determination of a moving camera position is critical when reconstructing three-dimensional (3-D) images of an object. If the 3-D locations of at least three points on an object are known at two different time instances, one can determine the camera coordinate transformation between the two time instances by analyzing the known coordinates with the Levenberg-Marquardt minimization method, as disclosed in [3] and [4]. The problem with current 3-D imaging methods resides in the fact that the 3-D position of object features are usually obtained via inaccurate techniques which ultimately limit the accuracy and resolution of the 3-D reconstruction of the object. Current methods in computer vision use either mono or stereo features to find camera pose, or the "structure from motion" techniques described in [1]. The main drawback of these techniques is that the resolution is limited to approximately 200 microns. This resolution range is insufficient to support many practical applications, such as dental imaging, which requires a resolution of approximately 25-50 microns. Also, the current techniques can produce large error levels when imaging an object which does not have many detectable corners.

Thus, a continuing need exists for a method and device for 3-D imaging which can resolve camera pose and produce a high-resolution 3-D image of the object.

(3) References Cited

[1] F. Dellaert, S. Seitz, C. Thorpe, and S. Thrun (2000), "Structure from motion without correspondence," *IEEE Computer Society Conference on Computer Vision and Pattern Recognition.*

[2] C. Willert and M. Gharib (1992), "Three-dimensional particle imaging with a single camera," *Experiments in Fluids* 12, 353-358.

[3] Kenneth Levenberg (1944). "A Method for the Solution of Certain Non-Linear Problems in Least Squares," *The Quarterly of Applied Mathematics* 2, 164-168.

[4] Donald Marquardt (1963). "An Algorithm for Least-Squares Estimation of Nonlinear Parameters," *SIAM Journal on Applied Mathematics* 11, 431-441, doi:10.1137/0111030a.

[5] D. Lowe (1999), "Object recognition from local scale-invariant features," *Proceedings of the International Conference on Computer Vision* 2: 1150-1157.

SUMMARY OF THE INVENTION

The present invention relates to three-dimensional imaging and, more particularly, to a method and device for high-resolution three-dimensional (3-D) imaging which obtains camera pose using defocusing.

A first aspect of the present invention is a method for determining a change in pose of a moving sensor using a defocusing technique. The method involves capturing, at an initial time, an initial plurality of defocused images of an object substantially simultaneously with a sensor, from an initial sensor pose. Next, 3-D locations of three or more object features are extracted from the relative locations of the object features in the plurality of defocused images on the sensor. The next act requires capturing, at a subsequent time, a subsequent plurality of defocused images of the object substantially simultaneously, from a subsequent sensor pose. Then, object features from the initial plurality of defocused images are matched with corresponding object features from the subsequent plurality of defocused images using either a feature matching algorithm or an error minimization method. Finally, a change in pose of the sensor between the initial and subsequent times is calculated using the 3-D locations extracted from the initial and subsequent pluralities of defocused images, whereby the change in pose of the moving sensor is determined.

In another aspect, the method further comprises an act of constructing a high-resolution 3-D image of the object. First, a pattern of markers is projected on the object. Next is capturing, at the initial time, and from the initial sensor pose, an initial plurality of defocused images of the projected pattern of markers with the sensor, the defocused images being differentiable from the initial pluralities of defocused images of the object used for determining sensor pose. A 3-D image of the object is constructed based on relative positions of the initial plurality of defocused images of the projected pattern of markers on the sensor. Then, at the subsequent time, and from the subsequent sensor pose, a subsequent plurality of defocused images of the projected pattern of markers is captured with the sensor, the defocused images being differentiable from the subsequent pluralities of defocused images of the object used for determining sensor pose. A 3-D image of the object is constructed based on relative positions of the subsequent plurality of defocused images of the projected pattern of markers on the sensor. Finally, the 3-D images constructed from the initial and subsequent pluralities of defocused images of the projected pattern of markers are overlaid using the known change in sensor pose between the initial and subsequent times as previously calculated to produce a high-resolution 3-D image of the object.

In yet another aspect, the method further comprises acts for resolving the detailed 3-D image of the object to a desired resolution. At a second subsequent time, a second subsequent plurality of defocused images of the object is captured substantially simultaneously, from a second subsequent sensor pose. Then, the object features from the subsequent plurality of defocused images are matched with corresponding object features from the second subsequent plurality of defocused images using either a feature matching algorithm or an error minimization method. Next, a change in pose of the sensor between the subsequent and second subsequent times is calculated using the 3-D locations extracted from the subsequent and second subsequent pluralities of defocused images. Also, a pattern of markers is projected on the object. Then, at the second subsequent time, and from the second subsequent sensor pose, a second subsequent plurality of defocused images of the projected pattern of markers is captured with the sensor, the defocused images being differentiable from the second subsequent pluralities of defocused images of the object used for determining sensor pose. A 3-D image of the object is constructed based on relative positions of the second subsequent plurality of defocused images of the projected pattern of markers on the sensor. Then, the 3-D images constructed from the initial, subsequent, and second subsequent pluralities of defocused images of the projected pattern of markers are overlaid using the known change in sensor pose between the initial and second subsequent times to produce a high-resolution 3-D image of the object. Finally, these acts are repeated at further subsequent times and at further subsequent camera poses until a desired resolution is reached.

In another aspect, the method further comprises acts for calculating an absolute pose of the sensor with respect to an environment. First, a plurality of defocused images of three or more fixed features in the environment is captured with the sensor. Next, 3-D locations of three or more fixed points in the environment are extracted from the relative locations of the fixed points in the plurality of defocused images on the sensor. Finally, the absolute pose of the sensor is calculated using the 3-D locations extracted from the plurality of defocused images.

The present invention also comprises an imaging device for producing a high-resolution three-dimensional (3-D) image of an object. The device has a lens obstructed by a mask having at least one set of off-axis apertures. The at least one set of off-axis apertures produces a plurality of defocused images of an object substantially simultaneously. A sensor is configured to capture the plurality of defocused images produced. The device also comprises a data processing system having one or more processors configured to determine a change in pose of the moving sensor according to the method of the present invention as previously described in this section.

In another embodiment, the device further comprises a projector for projecting a pattern of markers on the surface of the object, resulting in plurality of defocused images of the pattern of markers being produced on the sensor. The projected pattern of marker should be of a wavelength differentiable from the object features on the object used to determine pose. The data processing system is further configured to construct a detailed 3-D image of the object from the defocused images of the projected pattern of markers produced on the sensor, according to the method of the present invention as previously described in this section.

In a further embodiment, the data processing system of the device is further configured to calculate an absolute pose of the sensor with respect to the environment by the method of the present invention, as previously described in this section.

In another embodiment, the device has a lens obstructed by a mask having a first set and a second set of off-axis apertures. The first set of off-axis apertures comprises a plurality of apertures fitted with filter separators for capturing a plurality of defocused images of an object substantially simultaneously. The second set of off-axis apertures comprises a plurality of apertures fitted with filter separators differentiable from those of the first set of off-axis apertures for capturing a plurality of defocused images. The device further contains a projector for projecting a pattern of markers on the surface of the object, the projected pattern of markers being of a wavelength corresponding to the filter separators of the second set of off-axis apertures. Finally, sensor is configured to capture the defocused images produced, whereby the images captured on the sensor through the first set of off-axis apertures can be used to determine camera pose, and the images captured on the sensor through the second set of off-axis apertures can be used to construct a high-resolution three-dimensional image of the object.

In another aspect, the device further comprises a data processing system having one or more processors. The processors are configured to perform the acts of the method of the present invention, as previously described in this section.

As can be appreciated by one skilled in the art, the present invention also comprises a computer program product for determining a change in pose of a moving sensor using a defocusing technique. The computer program product comprises computer-readable instruction means stored on a computer-readable medium that are executable by a computer for causing the computer to perform the operations of the method of the present invention, as previously described in this section.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
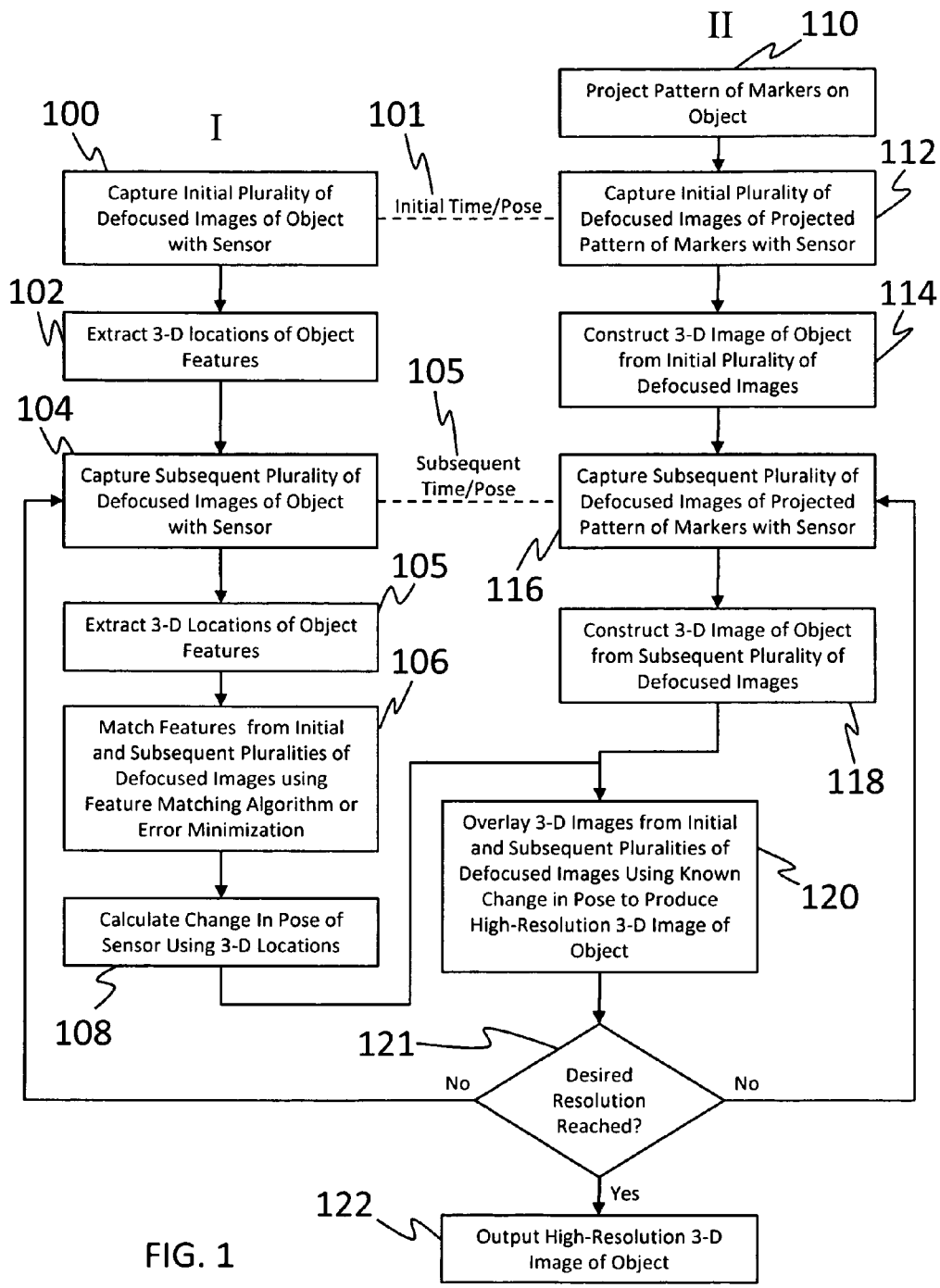
FIG. 1 is a flow diagram showing the acts of the method of the present invention.

The present invention relates to three-dimensional imaging and, more particularly, to a method and device for high-resolution three-dimensional imaging which obtains camera pose using defocusing. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Glossary of Terms

Filter Separators—referring to electromagnetic (including optical) filters, acoustic filters, and spatially biased aperture filters.

Pose—a term known in the art to represent the spatial location (e.g., x, y, z) and orientation (e.g., tilt) of a camera/sensor with respect to an object. The term absolute pose refers to the location and orientation of a camera/sensor with respect to fixed features in the environment (e.g., the walls of a room).

Object Features—fixed features on an object, such as edges, protrusions, spots, etc., or they may be template features physically applied to the surface of the object, such as a painted-on or dyed point grid.

(2) Description

The present invention relates to three-dimensional imaging and, more particularly, to a method and device for high-resolution three-dimensional (3-D) imaging which obtains camera pose using defocusing. The defocusing concept was first introduced in [1], showing how the 3-D location of a point can be accurately determined by two off-axis apertures. Two defocused images are generated from the apertures and are then used to obtain the depth location of the point from the relative location between the two images. The present invention uses the concept of defocusing to resolve the pose of a moving camera. This, in conjunction with other defocusing imaging techniques, can produce a 3-D image of an object with effectively unlimited resolution.

FIG. 1 is a flow diagram showing the complete method of the present invention. The acts in column I, corresponding to reference numbers 100-108, are the acts for determining the change in pose of a moving camera/sensor using a defocusing technique. The acts in column II, corresponding to reference numbers 110-118, are the acts for constructing a detailed 3-D image of the object using defocusing of a projected pattern of markers on the object. The acts of columns I and II occur concurrently, and are linked at an initial time 101, and a subsequent time 105. The results of columns I and II are combined to produce a high resolution 3-D image 120 of the object. It should be noted that the example in FIG. 1 is not the only functional ordering of acts of the present invention, but is instead a non-limiting example of a functional ordering of acts, i.e., it is possible that certain acts may be done in a different order and still produce a similar end result.

Column I in FIG. 1 refers to the acts of the method for determining a change in pose of a moving sensor. First, an initial plurality of defocused images of an object is captured 100 with a sensor at an initial time and camera pose 101. The 3-D locations of object features are extracted 102 using defocusing equations known in the art, see [2]. Object features are fixed features on the object. The object features may be natural features such as edges, protrusions, spots, etc., or they may be template features physically applied to the surface of the object, such as a painted-on or dyed point grid. At a subsequent time and camera pose 105, a subsequent plurality of defocused images of the object is captured 104 with the sensor. The 3-D locations of object features from the subsequent plurality of defocused images are extracted 105 using defocusing equations known in the art, see [2]. The object features from the initial plurality of defocused images are matched 106 with the corresponding object features in the subsequent plurality of defocused images using either a feature matching algorithm or an error minimization method. With regard to feature matching algorithms, the method of the present invention can utilize any of a variety known in the art, including but not limited to Scale-invariant Feature Transform (SIFT), see [5]. With regard to error minimization methods, the method of the present invention can utilize any of a variety known in the art, including but not limited to the Levenberg-Marquardt minimization method, see [3] and [4]. In general, SIFT is more computationally efficient than the Levenberg-Marquardt minimization method, but for certain aperture systems, SIFT cannot be applied, in which case error minimization such as Levenberg-Marquardt must be used. Further detail regarding various aperture systems are described subsequently and with respect to FIGS. 3 and 4. The feature matching act allows the previously extracted 102 object feature 3-D locations to be applied to the object features extracted from the subsequent plurality of images 105. Using the 3-D object feature locations from the initial and subsequent pluralities of defocused images, the change in pose of the sensor from the initial pose 101 to the subsequent pose 105 can be calculated 108. Techniques for calculating change in camera pose given an initial and subsequent set of three-dimensional coordinates are known in the art. A non limiting example of a technique for calculating a change in camera pose is generally called a "least squares method," which includes a more specific technique called "singular value decomposition." The "singular value decomposition"

method involves solving the following simple algebraic equation:

$$[X, Y, Z] [T] = [x, y, z]$$

Where:
- [X, Y, Z] represents the three-dimensional coordinates in the initial image;
- [x, y, z] represents the three-dimensional coordinates in the subsequent image; and
- [T] represents a "rigid body transformation matrix" which is the change in pose of the camera from the initial to the subsequent times.

Optionally, in order to obtain an absolute sensor pose (i.e., the location and orientation of the sensor with respect to a surrounding environment), acts of capturing an initial plurality of defocused images with a sensor 100 and extracting 3-D locations of object features 102 are executed, but with respect to fixed points of known absolute position in the environment. Given the extracted 3-D locations of the fixed features with respect to the sensor, and the known absolute positions of those features in the environment, the absolute pose of the sensor with respect to the environment can be calculated, see [3] and [4] and the "singular value decomposition" equation above.

Column II in FIG. 1 refers to the acts in the method for constructing a 3-D image of an object using a projected pattern of marker point. First, a pattern of markers is projected 110 on the object. The projected marker points need not be fixed, in contrast to the object features used when determining camera pose (column I). Now referring back to column II, an initial plurality of defocused images of the projected pattern of markers is captured 112 with a sensor at the initial time and pose 101. This act occurs contemporaneously with the act of capturing the initial plurality of defocused images of the object 100. Next, a 3-D image of the object is constructed 114 from the initial plurality of defocused images of the projected pattern of markers. The 3-D image is produced by determining the 3-D locations of each projected marker point using the defocusing equations known in the art as disclosed in [2]. At the subsequent time and sensor pose 105, a subsequent plurality of defocused images of the projected pattern of markers is captured 116 with the sensor. This act occurs contemporaneously with act of capturing the subsequent plurality of defocused images of the object 104. Then, another 3-D image of the object is constructed 118 from the subsequent plurality of defocused images of the projected marker points.

The next act in the method is to overlay 120 the 3-D images from the initial and subsequent pluralities of defocused images using the known change in sensor pose from the initial 101 and subsequent 105 times to produce a high-resolution 3-D image of the object. If the resulting image is of a desired resolution 121, then the image can be output 122 or stored. If the desired resolution 121 is not reached, the method can be extended by repeating the acts from act 104 onward in column I and from act 116 onward in column II at further subsequent times and from further subsequent sensor poses until the desired resolution is reached 121. Repeating the method in this manner allows for effectively unlimited resolution in the 3-D image. The only limitation to resolution is the time required to accomplish the number of iterations of the method necessary to produce the desired resolution.

Figure 2B:
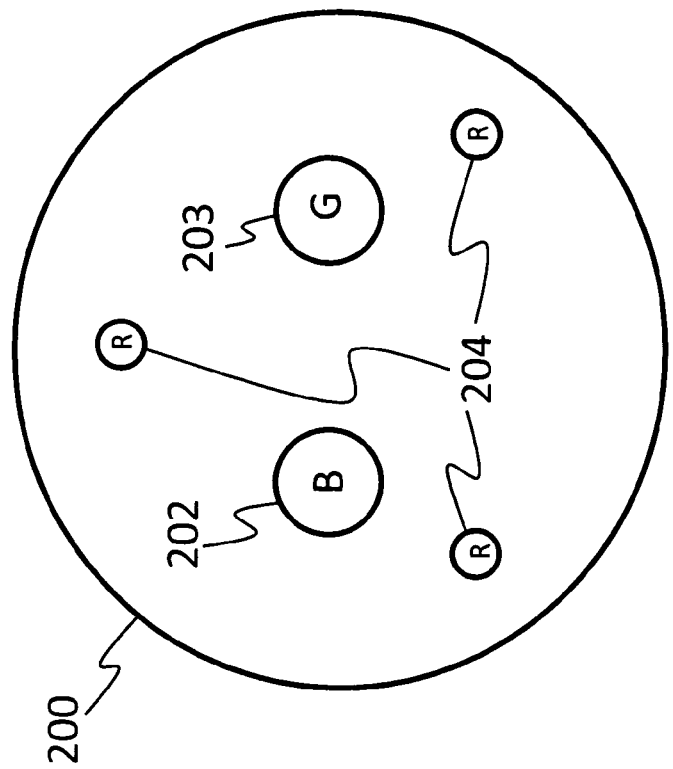
FIG. 2 is an illustration showing an aperture mask for use with the device of the present invention.
Figure 2A:
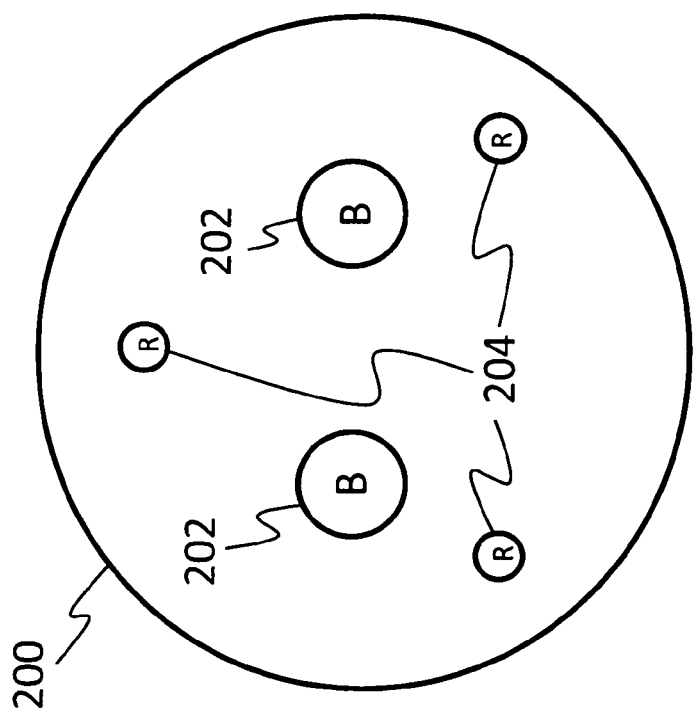

The present invention is also an imaging device. Defocusing imaging devices generally use a camera mask having a plurality of off-axis apertures, the off-axis apertures producing the defocused images. FIGS. 2A and 2B show non-limiting examples of specialized aperture masks 200 for use with the device of the present invention. The masks 200 have a first set of off-axis apertures 202 (and 203 in FIG. 2B), and a second set of off axis apertures 204. The first set of off-axis apertures 202 and 203 comprises a plurality of apertures fitted with filter separators for capturing a plurality of defocused images of an object substantially simultaneously. The term filter separator, as used in this specification, comprises electromagnetic (including optical) filters, acoustic filters, and spatially biased aperture filters. The first set of off-axis apertures is used to determine camera pose, as described above in the acts of column I of FIG. 1. In the example in FIG. 2A, the first set of off axis apertures 202, comprises a set of two apertures fitted with blue optical filters 202 for producing blue defocused images. In this example both apertures of the first set of apertures 202 are fitted with the same (blue) filter separators. However, it is also possible to differentiate each of the plurality of apertures comprising the first set of apertures 202 from each other using different filter separators, for example, one blue 202 and one green 203 as in FIG. 2B. Such a filtered aperture arrangement will produce defocused images of different colors on the sensor, which makes distinguishing the defocused images considerably easier, thereby reducing computation time during the feature matching acts, as previously described. A system using the aperture mask in FIG. 2B performs particularly well when implementing a Scale-invariant Feature Transform (SIFT) feature matching algorithm (see [5]) to match features from the initial and subsequent images. However, other feature matching algorithms known in the art may also be functional, and it is also possible to use an error minimization technique such as Levenberg-Marquardt minimization (see [3] and [4]) instead of a feature matching algorithm. Now referring to both FIGS. 2A and 2B, the aperture mask 200 further comprises a second set of off-axis apertures 204. The second set of off-axis apertures is fitted with filter separators differentiable from those of the first set of off-axis apertures 202. The example in FIG. 2 shows a triad of three off-axis apertures 204 fitted with red optical filters for producing red defocused images. Note the example shown in FIG. 2 is non-limiting. Further non-limiting examples of aperture and filter separator types for use with the present invention are described in U.S. patent application Ser. No. 12/011,023, filed Jan. 22, 2008, entitled "METHOD AND APPARATUS FOR QUANTITATIVE 3-D IMAGING;" U.S. patent application Ser. No. 12/011,016, filed Jan. 22, 2008, entitled "METHOD AND APPARATUS FOR QUANTITATIVE 3-D IMAGING;" U.S. patent application Ser. No. 12/150,237, filed on Apr. 23, 2008, entitled "SINGLE-LENS, SINGLE-APERTURE, SINGLE-SENSOR 3-D IMAGING DEVICE;" U.S. patent application Ser. No. 12/150,238, filed on Apr. 23, 2008, entitled "SINGLE LENS 3-D IMAGING DEVICE USING A POLARIZATION-CODED APERTURE MASK COMBINED WITH A POLARIZATION-SENSITIVE SENSOR;" U.S. patent application Ser. No. 12/150,239, filed on Apr. 23, 2008, entitled "APERTURE SYSTEM WITH SPATIALLY-BIASED APERTURE SHAPES AND POSITIONS (SBPSP) FOR STATIC AND DYNAMIC 3-D DEFOCUSING-BASED IMAGING;" and U.S. patent application Ser. No. 12/150,236, filed on Apr. 23, 2008, entitled "SINGLE-LENS, SINGLE-SENSOR 3-D IMAGING DEVICE WITH A CENTRAL APERTURE FOR OBTAINING CAMERA POSITION," all of which are incorporated by reference as though fully set forth herein.

Figure 3:
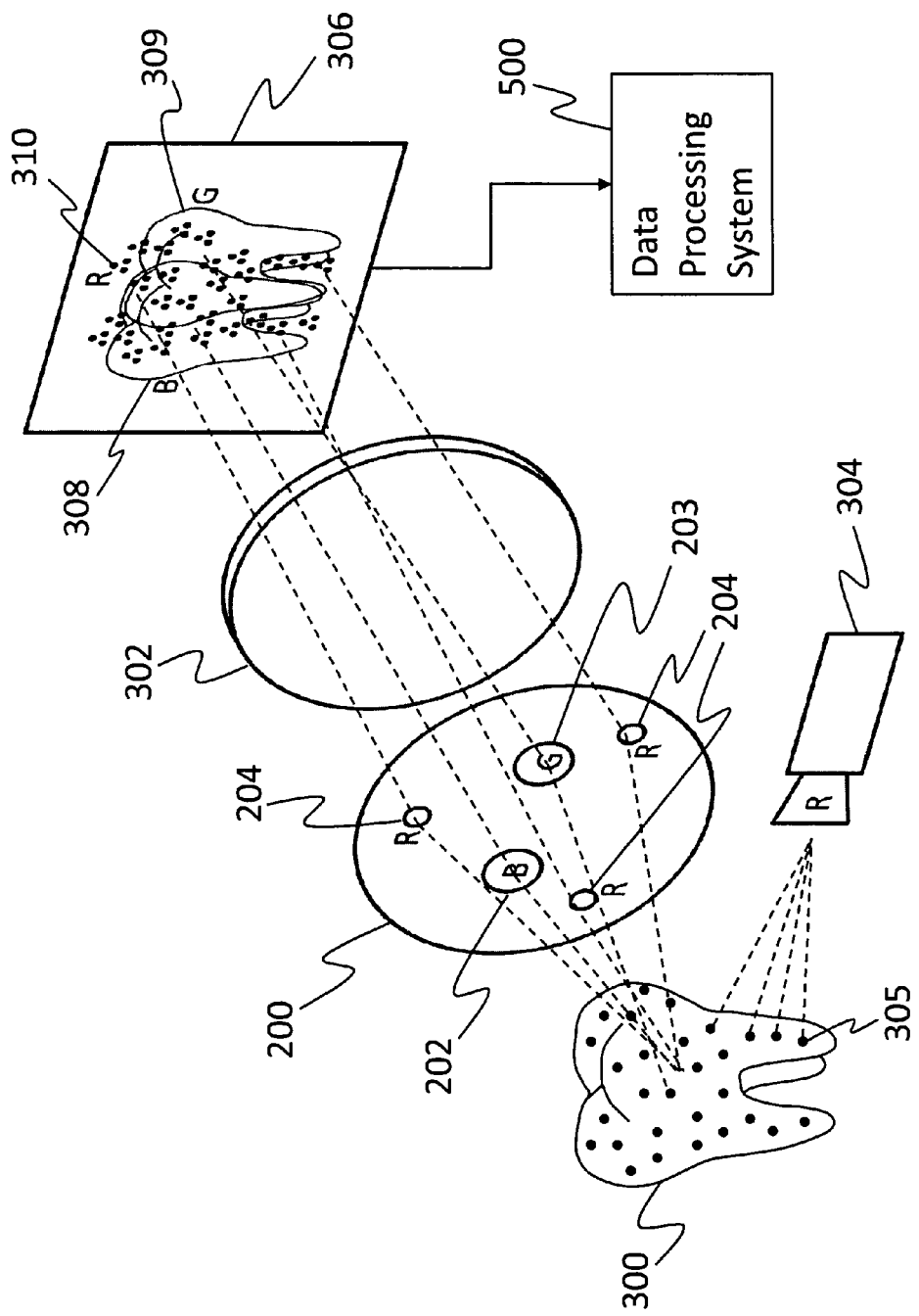
FIG. 3 is an illustration showing the components of the device of the present invention using an aperture mask with two sets of filtered apertures.

FIG. 3 is an illustration showing the components of a preferred embodiment of the imaging device of the present invention. The imaging device comprises a lens 302 obstructed by a mask 200 having a first set 202 and 203 and a second set 204 of off axis apertures for producing a plurality of defocused images of an object 300 on a sensor 306. The first set of off axis apertures 202 and 203, as previously discussed, is used to produce defocused images for determining camera pose. FIG. 3 shows a first set of off-axis apertures comprising two apertures 202 and 203, differentiated by a blue and a green filter separator for producing a blue and a green defocused image 308 and 309 on the sensor 306. Note that the device in FIG. 3 implements the aperture mask shown in FIG. 2B. The device further comprises a projector 304 for projecting a pattern of marker points 305 on the surface of the object 300. The projector 304 projects the marker points 305 at a wavelength corresponding to the wavelength of the filter separators of the second set of off-axis apertures 204. The second set of off-axis apertures 204 is used to generate the 3-D images of the object 300 that will be overlaid to produce the high-resolution 3-D image. In FIG. 3, the projector 304 projects a pattern of red marker points 305 and, correspondingly, the second set of off-axis apertures 204 selectively transmits the red projected pattern 305, producing a plurality of defocused images of the projected marker points 310 on the sensor 306. In the example shown, the second set of apertures 204 is arranged in a triad, whereby the plurality of images produces an image triad 310 for every marker point. The physical size of the image triad 310 can be used to calculate the depth location of each marker point 305 on the object 300 via the defocusing equations in [2]. The sensor 306 used should be configured to capture the defocused image types produced. In this case, a sensor capable of capturing blue and red images should be used. The images produced are sent to a data processing system 500 (in FIG. 5) for calculation and analysis in accordance with the method of the present invention, as previously discussed. It should be noted that the system embodiment shown in FIG. 3 performs particularly well when implementing a Scale-invariant Feature Transform (SIFT) feature matching algorithm (see [5]) to match features from the initial and subsequent pluralities of defocused images. However, other feature matching algorithms known in the art may also be functional, and it is also possible to use an error minimization technique such as Levenberg-Marquardt minimization (see [3] and [4]) instead of a feature matching algorithm.

Figure 4:
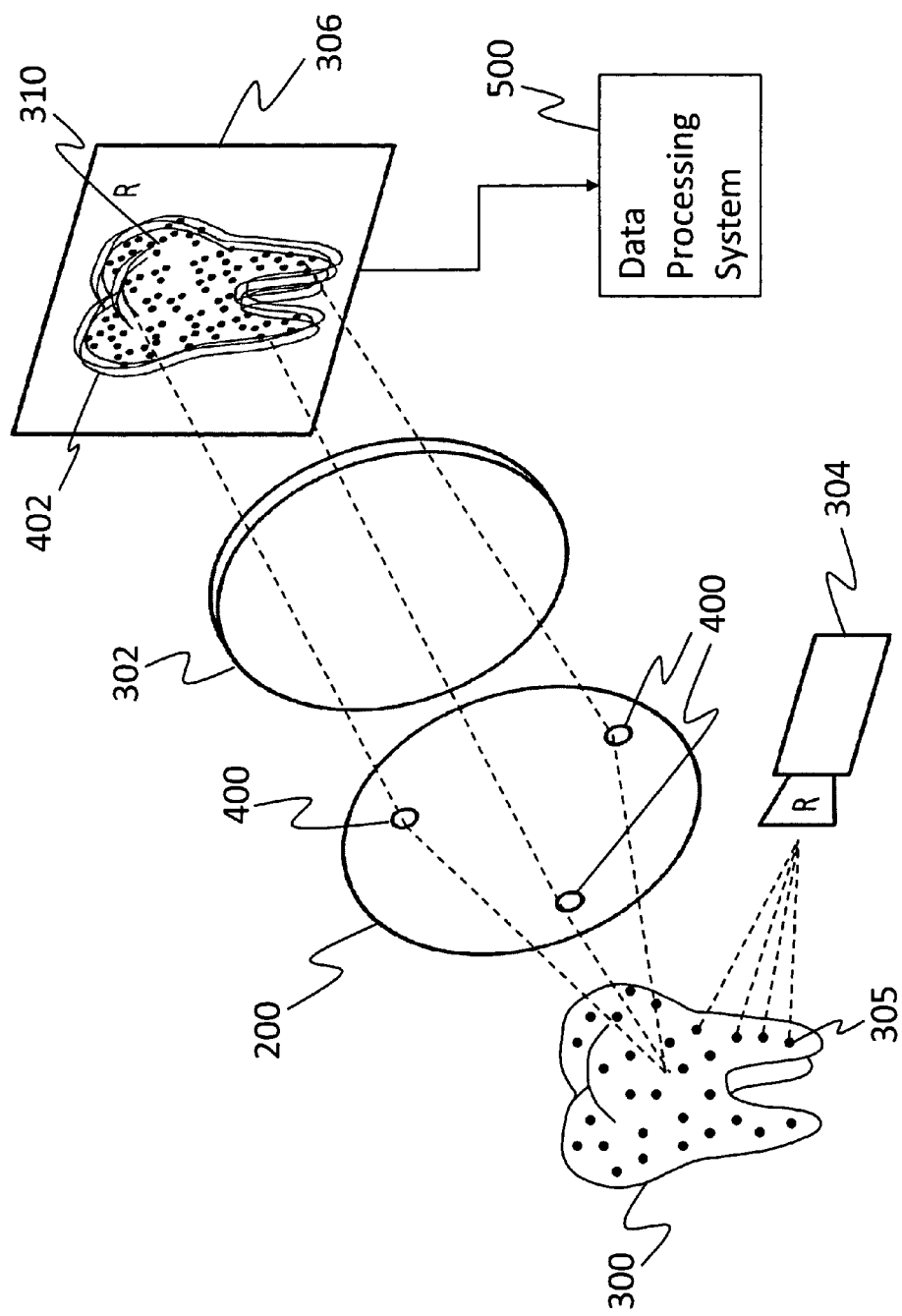
FIG. 4 is an illustration showing the components of the device using an aperture mask with one set of un-filtered apertures.

It should be noted that the above described device is a non-limiting example. It is also possible to construct the device with as few as one set of off-axis apertures and without filter separators. FIG. 4 is a non-limiting example of a more basic embodiment of the present invention. The device comprises a lens 302 obstructed by an aperture mask 200 having at least one set of off-axis apertures 400, in this case one set of three off-axis apertures. In this embodiment, the single triad of apertures 400 will serve the dual purpose of: (1) producing defocused images 402 of the object 300; and (2) if a projected pattern of markers 305 is used, producing defocused images of the projected pattern of markers 310 on the sensor 306. The projector 304 shown in FIG. 4 projects red marker points 305 on the object 300. Since there are no filter separators in this embodiment, the projector markers' 305 wavelength should be differentiable from the object features (edges, protrusions, dyed-on in spots, etc.) on the object 300. This ensures that the defocused images of the object 402 used to determine camera pose are differentiable from the defocused images of the projected pattern of markers 310 used to developed the high-resolution 3-D image. This embodiment of the device can also comprise a data processing system 500 for processing the image data from the sensor 306 according to the method of the present invention. It should be noted that when a single unfiltered aperture set as in FIG. 4 is used, the system will not be able to implement the SIFT feature matching algorithm (see [5]) to match features between the initial and subsequent pluralities of defocused images. Therefore, an error minimization method such as but not limited to Levenberg-Marquart minimization (see [3] and [4]) can be used instead. It should be noted that although SIFT is not functional with the single unfiltered aperture set system (FIG. 4), it is possible that other feature matching algorithms will be functional, and therefore feature matching algorithms in general should not be excluded as a viable technique for matching features produced by this type of system.

Figure 5:
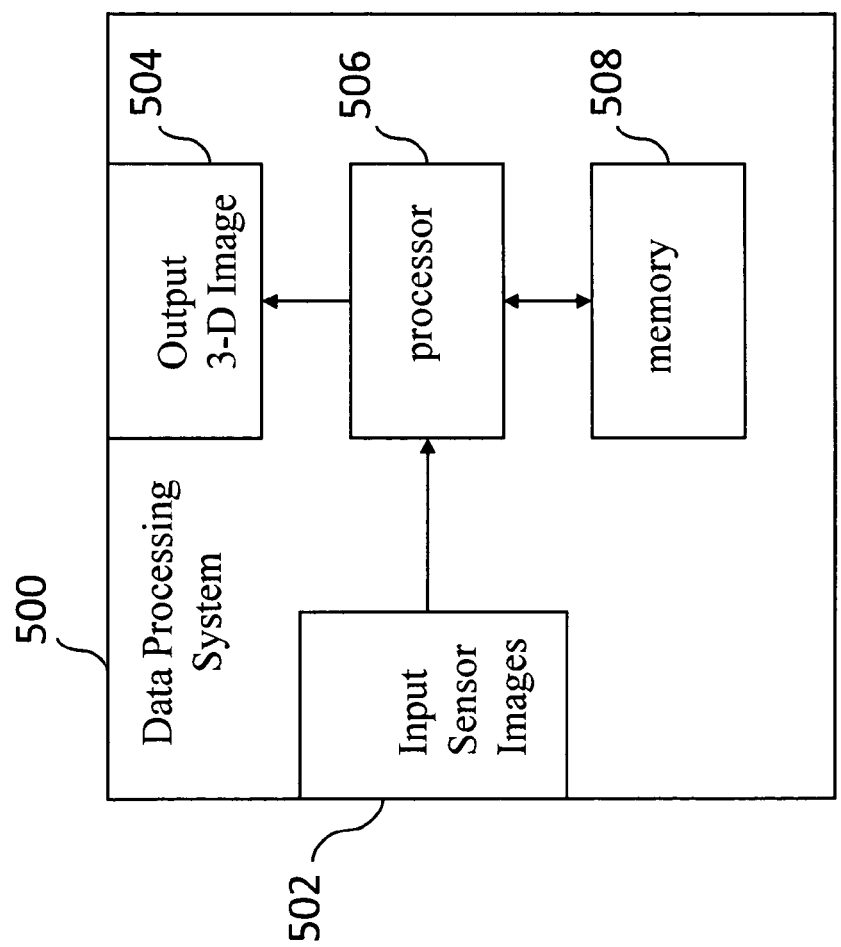
FIG. 5 is a block diagram showing a generic data processing system for use with the present invention.

A block diagram depicting the components of a generic image analysis data processing system for use with the present invention is provided in FIG. 5. The data processing system 500 comprises an input 502 for receiving the input images. Note that the input 502 may include multiple "ports." Typically, input is received from at least one imaging device, or from stored images. An output 504 is connected with the processor for outputting the high-resolution 3-D image produced. Output may also be provided to other devices or other programs; e.g., to other software modules, for use therein. The input 502 and the output 504 are both coupled with one or more processors 506, the processor containing appropriate architecture to perform the acts of the method of the present invention. The processor 506 is coupled with a memory 508 to permit storage of data such as image memory strings and software that are to be manipulated by commands to the processor 506.

Figure 6:
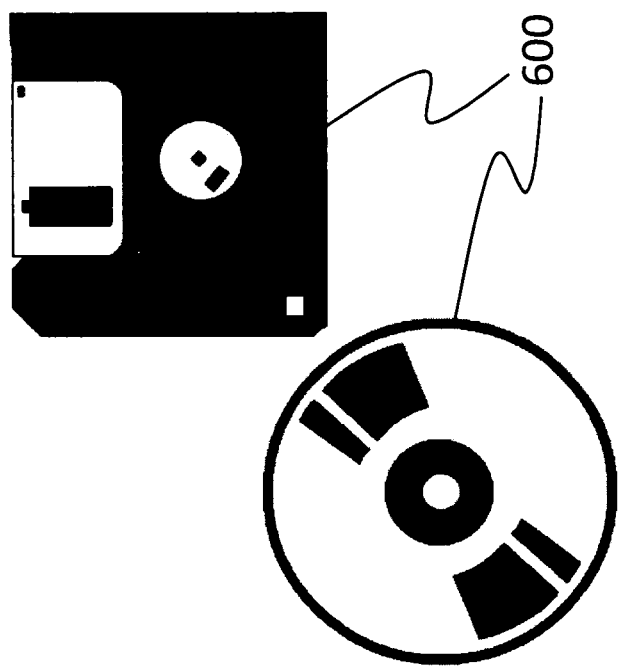
FIG. 6 is an illustration showing examples of computer program products for use with the present invention.

An illustrative diagram of a computer program product embodying the present invention is depicted in FIG. 6. The computer program product 600 is depicted as an optical disk such as a CD or DVD, but the computer program product generally represents any platform containing comprising computer-readable instruction means stored on a computer-readable medium that are executable by a computer having a processor for causing the processor to perform operations of the method of the present invention, as previously described.

What is claimed is:

1. A method for determining a change in pose of a moving sensor of a high-resolution three-dimensional (3-D) imaging device, wherein the device comprises the sensor, a lens, and a mask having at least one set of off-axis apertures, the mask being positioned to obstruct the lens, the method using a defocusing technique comprising acts of:

capturing, at an initial time, an initial plurality of defocused images of a substantially stationary object with a sensor, from an initial sensor pose, the initial plurality of images being formed from light having passed through the lens and the at least one set of off-axis apertures in the mask;

extracting three-dimensional (3-D) locations of three or more object features from the relative locations of the object features in the initial plurality of defocused images on the sensor;

capturing, at a subsequent time, a subsequent plurality of defocused images of the object from a subsequent sensor pose, the subsequent plurality of images being formed from light having passed through the lens and the at least one set of off-axis apertures in the mask;

extracting 3-D locations of three or more object features from the relative locations of the object features in the subsequent plurality of defocused images on the sensor;

matching the object features from the initial plurality of defocused images with corresponding object features from the subsequent plurality of defocused images using a technique selected from the group consisting of:
a feature matching algorithm; and
an error minimization method; and calculating a change in pose of the sensor between the initial and subsequent times using the 3-D locations extracted from the initial and subsequent pluralities of defocused images, whereby the change in pose of the moving sensor is determined.

2. The method of claim 1, further comprising:

projecting a pattern of markers on the object;

capturing, at the initial time, and from the initial sensor pose, an initial plurality of defocused images of the projected pattern of markers with the sensor;

constructing a 3-D image of the object based on relative positions of the initial plurality of defocused images of the projected pattern of markers on the sensor;

capturing, at the subsequent time, and from the subsequent sensor pose, a subsequent plurality of defocused images of the projected pattern of markers with the sensor;

constructing a 3-D image of the object based on relative positions of the subsequent plurality of defocused images of the projected pattern of markers on the sensor; and combining the 3-D images constructed from the initial and subsequent pluralities of defocused images of the projected pattern of markers using the known change in sensor pose between the initial and subsequent times to produce a high-resolution 3-D image of the object.

3. The method of claim 1, further comprising an act of calculating an absolute pose of the sensor with respect to an environment by:

capturing a plurality of defocused images of three or more fixed features of known position in the environment with the sensor; and extracting 3-D locations of the three or more fixed features in the environment from the relative locations of the fixed features in the plurality of defocused images on the sensor; and calculating the absolute pose of the sensor using the 3-D locations extracted from the plurality of defocused images.

4. An imaging device for producing a high-resolution three-dimensional (3-D) image of an object, comprising:

a lens obstructed by a mask having at least one set of off-axis apertures for producing a plurality of defocused images of a substantially stationary object;

a sensor configured to capture the plurality of defocused images produced; and a data processing system having one or more processors configured to:

capture, at an initial time, an initial plurality of defocused images of an object with a sensor, from an initial sensor pose;

extract three-dimensional (3-D) locations of one or more object features from the relative locations of the object features in the initial plurality of defocused images on the sensor;

capture, at a subsequent time, a subsequent plurality of defocused images of the object from a subsequent sensor pose;

match the object features from the initial plurality of defocused images with corresponding object features from the subsequent plurality of defocused images using a technique selected from the group consisting of:
a feature matching algorithm; and
an error minimization method; and calculate a change in pose of the sensor between the initial and subsequent times using the 3-D locations extracted from the initial plurality of defocused images, whereby the change in pose of the moving sensor is determined.

5. An imaging device for producing a high-resolution three-dimensional (3-D) image of an object, comprising;

a lens obstructed by a mask having a first set and a second set of off-axis apertures where;

the first set of off-axis apertures comprises a plurality of apertures fitted with filter separators for capturing a plurality of defocused images of a substantially stationary object; and the second set of off-axis apertures comprises a plurality of apertures fitted with filter separators differentiable from those of the first set of off-axis apertures for capturing a plurality of defocused images, a projector for projecting a pattern of markers on the surface of the object, the projected pattern of markers being of a wavelength corresponding to the filter separators of the second set of off-axis apertures; and a sensor configured to capture the defocused images produced, whereby the images captured on the sensor through the first set of off-axis apertures can be used to determine camera pose, and the images captured on the sensor through the second set of off-axis apertures can be used to construct a high-resolution three-dimensional image of the object.

6. The device of claim 5, wherein each of the plurality of apertures comprising the first set of off-axis apertures is fitted with a different type of filter separator, such that the defocused images produced through said apertures are differentiable from one another.

7. The method of claim 2, further comprising an act of calculating an absolute pose of the sensor with respect to an environment by:

capturing a plurality of defocused images of three or more fixed features of known position in the environment with the sensor; and extracting 3-D locations of the three or more fixed features in the environment from the relative locations of the fixed features in the plurality of defocused images on the sensor; and calculating the absolute pose of the sensor using the 3-D locations extracted from the plurality of defocused images.

8. An imaging device for producing a high-resolution three-dimensional (3-D) image of an object, comprising:

a lens obstructed by a mask having at least one set of off-axis apertures for producing a plurality of defocused images of a substantially stationary object;

a sensor configured to capture the plurality of defocused images produced; and a data processing system having one or more processors configured to:

extract three-dimensional (3-D) locations of one or more object features from the relative locations of the object features in an initial plurality of defocused images captured at an initial time with the sensor;

match the object features from the initial plurality of defocused images with corresponding object features from a subsequent plurality of defocused images, captured at a subsequent time with the sensor, using a technique selected from the group consisting of:
a feature matching algorithm; and
an error minimization method; and
calculate a change in pose of the sensor between the initial and subsequent times using the 3-D locations extracted from the initial plurality of defocused images,
whereby the change in pose of the moving sensor is determined.

9. The imaging device of claim 8, further comprising:
a projector adapted to project a pattern of markers on the surface of the object.

10. The imaging device of claim 9, wherein the data processing system is further configured to:
construct a 3-D image of a surface of the object based on relative positions of the projected pattern of markers in a plurality of defocused images captured with the sensor.

11. The imaging device of claim 8, wherein the data processing system is further configured to calculate an absolute pose of the sensor relative to an environment.

12. The imaging device of claim 11, wherein the data processing system is configured to:
extract 3-D locations of three or more fixed features of known position in the environment from relative locations of the fixed features in a plurality of defocused images captured with the sensor; and
calculate the absolute pose of the sensor using the 3-D locations extracted from the plurality of defocused images.

13. The device of claim 5, wherein the device further comprises a data processing system, the data processing system having one or more processors configured to:
extract three-dimensional (3-D) locations of three or more object features from the relative locations of object features in an initial plurality of defocused images captured with the sensor;
extract three-dimensional (3-D) locations of three or more object features from the relative locations of the object features in a subsequent plurality of defocused images captured with the sensor;
match the object features from the initial plurality of defocused images with corresponding object features from the subsequent plurality of defocused images using a technique selected from the group consisting of:
a feature matching algorithm; and
an error minimization method; and
calculate a change in pose of the sensor between the initial and subsequent times using the 3-D locations extracted from the initial and subsequent pluralities of defocused images, whereby the change in pose of the moving sensor is determined.

14. The device of claim 13, further configured to:
capture a plurality of defocused images of a projected pattern of markers on the object with the sensor, the defocused images being differentiable from the initial and subsequent pluralities of defocused images of the object used for determining sensor pose; and
construct a 3-D image of a surface of the object based on relative positions of the plurality of defocused images of the projected pattern of markers on the sensor.

15. The device of claim 14, wherein the data processing system is further configured to calculate an absolute pose of the sensor relative to an environment.

16. The device of claim 15, wherein each of the first set of off-axis apertures is fitted with a different type of filter separator, such that the defocused images produced through said apertures are differentiable from one another.

* * * * *